US012123623B1

(12) United States Patent
Kaiser

(10) Patent No.: US 12,123,623 B1
(45) Date of Patent: Oct. 22, 2024

(54) SYSTEM AND METHOD FOR HEAT AND ENERGY RECOVERY AND REGENERATION

(71) Applicant: Commercial Energy Saving Plus, LLC, Boca Raton, FL (US)

(72) Inventor: Stewart Kaiser, Stroudsburg, PA (US)

(73) Assignee: COMMERCIAL ENERGY SAVING PLUS, LLC, Boca Raton, FL (US)

( * ) Notice: Subject to any disclaimer, the term of this patent is extended or adjusted under 35 U.S.C. 154(b) by 796 days.

(21) Appl. No.: 17/193,695

(22) Filed: Mar. 5, 2021

Related U.S. Application Data

(60) Division of application No. 16/111,373, filed on Aug. 24, 2018, now Pat. No. 10,982,862, which is a
(Continued)

(51) Int. Cl.
*F24H 15/25* (2022.01)
*F24D 5/04* (2006.01)
(Continued)

(52) U.S. Cl.
CPC ............... *F24H 15/25* (2022.01); *F24D 5/04* (2013.01); *F24D 12/02* (2013.01); *F24H 3/065* (2013.01);
(Continued)

(58) Field of Classification Search
CPC . F24H 15/25; F24H 3/065; F24H 3/12; F24D 5/04; F24D 12/02; F24D 2200/04;
(Continued)

(56) References Cited

U.S. PATENT DOCUMENTS 3,917,444 A * 11/1975 Carthew ................. F23G 7/066
34/59
4,141,490 A 2/1979 Franchina
(Continued)

FOREIGN PATENT DOCUMENTS

CN 101718502 6/2010
EP 1607687 A2 12/2005

OTHER PUBLICATIONS

International Search Report, International Application No. PCT/US2013/060102, dated Feb. 18, 2014 (1 page).
(Continued)

*Primary Examiner* — Tho V Duong
(74) *Attorney, Agent, or Firm* — ALLEN, DYER ET AL.

(57) ABSTRACT

A heat recovery system includes a compressor, a solar panel, and a first heat exchanger and a second heat exchanger in fluid connection to form a closed circuit. The compressor is configured to facilitate fluid movement in the fluid circuit between the solar panel, the first heat exchanger and the second heat exchanger. The solar panel includes a plurality of solar cells connected in parallel, and each solar cell includes a plurality of metal tubes for fluid to pass through. A temperature sensor is mounted within each of the solar cells and configured to measure temperature inside the respective solar cell. Each solar cell is connected to the circuit via a respective pressure valve, and the status of the pressure valve is configured to depend on the measurement of the temperature sensor in the respective solar cell.

6 Claims, 18 Drawing Sheets

Related U.S. Application Data continuation-in-part of application No. 15/897,692, filed on Feb. 15, 2018, now abandoned.

(60) Provisional application No. 62/620,202, filed on Jan. 22, 2018.

(51) Int. Cl.
| | | |
|---|---|---|
| *F24D 12/02* | (2006.01) | |
| *F24H 3/06* | (2022.01) | |
| *F24H 3/12* | (2022.01) | |
| *F25B 29/00* | (2006.01) | |
| *F25B 47/02* | (2006.01) | |

(52) U.S. Cl.
CPC .............. *F24H 3/12* (2013.01); *F25B 29/00* (2013.01); *F25B 47/02* (2013.01); *F24D 2200/04* (2013.01); *F24D 2200/18* (2013.01); *F24D 2200/22* (2013.01); *F24D 2220/06* (2013.01); *F25B 2700/11* (2013.01)

(58) Field of Classification Search
CPC ............. F24D 2200/18; F24D 2200/22; F24D 2220/06; F25B 29/00; F25B 47/02; F25B 2700/11
See application file for complete search history.

(56) References Cited

U.S. PATENT DOCUMENTS

| | | | | |
|---|---|---|---|---|
| 4,173,994 | A | 11/1979 | Hiser | |
| 4,215,551 | A | 8/1980 | Jones | |
| 4,267,884 | A | 5/1981 | Gary | |
| 4,287,723 | A | 9/1981 | Dosmond | |
| 4,302,942 | A | 12/1981 | Charters | |
| 4,420,947 | A | 12/1983 | Yoshino | |
| 4,438,881 | A | 3/1984 | Pendergrass | |
| 4,452,620 | A * | 6/1984 | Dosmond | F24D 3/00 165/921 |
| 4,523,438 | A | 6/1985 | Curti | |
| 4,616,697 | A | 10/1986 | Kotaka | |
| 4,651,923 | A | 3/1987 | Ben-Shmuel et al. | |
| 4,687,133 | A | 8/1987 | Karlstedt | |
| 4,784,069 | A | 11/1988 | Stark | |
| 4,989,781 | A | 2/1991 | Guyer et al. | |
| 5,607,011 | A | 3/1997 | Abdelmalek | |
| 5,632,143 | A | 5/1997 | Fisher et al. | |
| 5,868,562 | A | 2/1999 | Watanabe et al. | |
| 6,779,735 | B1 | 8/2004 | Onstott | |
| 7,575,178 | B2 | 8/2009 | Loewen et al. | |
| 8,011,598 | B2 | 9/2011 | Kelly | |
| 9,341,383 | B2 * | 5/2016 | Aspeslagh | F24H 15/335 |
| 2008/0261093 | A1 | 10/2008 | Kelly | |
| 2010/0003552 | A1 * | 1/2010 | Kelly | F24D 12/02 429/411 |
| 2012/0131941 | A1 * | 5/2012 | Ackner | F24S 10/75 62/238.7 |
| 2012/0180511 | A1 * | 7/2012 | Pedersen | F24H 4/04 62/238.7 |
| 2012/0204587 | A1 * | 8/2012 | Zamir | F25B 27/005 62/235.1 |
| 2013/0312945 | A1 | 11/2013 | Karlstedt | |
| 2013/0333694 | A1 | 12/2013 | Zamir | |
| 2015/0267923 | A1 * | 9/2015 | Fan | F25B 30/02 62/238.7 |
| 2015/0267946 | A1 | 9/2015 | Lowstuter | |

OTHER PUBLICATIONS

European Searching Authority; Supplementary European Search Report and Written Opinion dated Oct. 7, 2016; entire document.

* cited by examiner

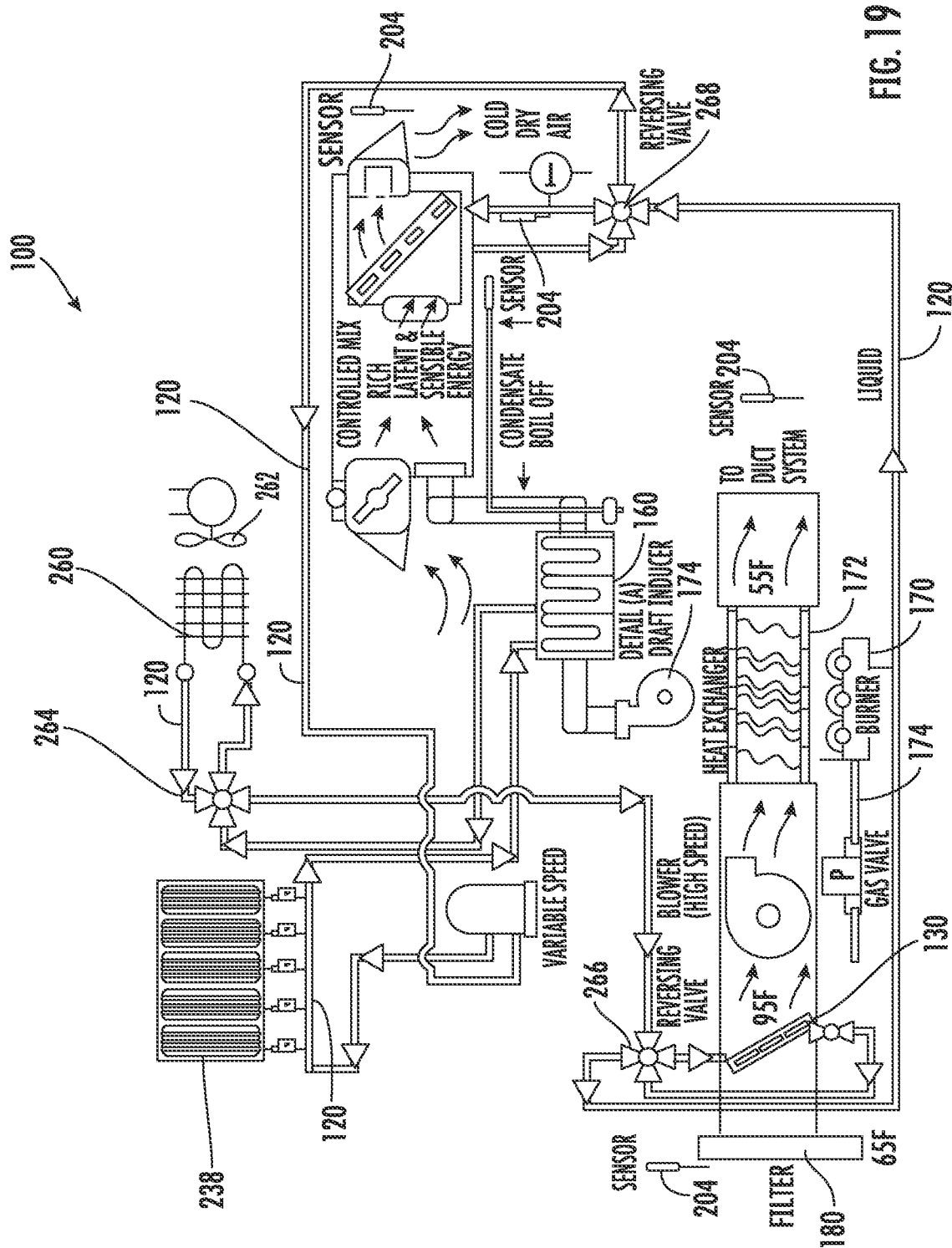

SYSTEM AND METHOD FOR HEAT AND ENERGY RECOVERY AND REGENERATION

CROSS-REFERENCE TO RELATED APPLICATION

This application is a divisional of U.S. patent application Ser. No. 16/111,373 filed on Aug. 24, 2018, which is a continuation-in-part of U.S. patent application Ser. No. 15/897,692 filed on Feb. 15, 2018, which claims the benefit of U.S. Provisional Patent Application Ser. No. 62/620,202, filed on Jan. 22, 2018, the contents of which applications are herein incorporated by reference in their entirety.

FIELD OF THE INVENTION

This invention relates generally to the field of air conditioning and heating systems, and more particularly, a heat and energy recovery system using solar energy for efficiently heating and cooling a space.

BACKGROUND OF THE INVENTION

The standard method of utilizing fossil fuels for heating involves firing the fuel in a controlled heating chamber or heat exchanger. The heat released on burning the fuel is drawn away by a fluid, often air or water, flowing around exterior surface of the heat exchanger. Heat transfer occurs spontaneously from a heat exchanger to the surrounding air or water in the conditioned space. Waste heat or emissions from the combustion reaction is allowed to flow outdoors, often via flue piping to a chimney or stack. The efficiency of the furnace or boiler is quantified in terms of the amount of heat extracted from the heat exchanger and used to heat the conditioned space and the amount of heat and by-products permitted to escape through the flue. Often, the efficiency of a furnace or boiler is indicated on the product at the point of sale.

Releasing carbon- and heat-saturated emissions into the atmosphere can impact the environment. Carbon dioxide in the atmosphere contributes to the greenhouse effect. An average residential furnace for natural gas, LPG or oil of low-to-medium efficiency will emit 1 million BTU's of waste heat into the atmosphere per day. Commercial and industrial units discharge hundreds of millions, and occasionally billions, of BTUs per unit per day. These common and traditional methods of discharging the flue gas into the atmosphere are wasteful and inefficient. Moreover, moving heat efficiently through a refrigeration circuit requires a significant amount of electrical power. Electrical consumption is deducted from the total thermal output to calculate the operating efficiency of a heating system.

In addition, conventional heat recovery system uses fossil fuels for a thermal chemical reaction in furnaces and boilers or electrical consumption to operate a refrigeration circuit to move thermal energy from one location to another. The fossil fuel burning furnace ignites fuel such as propane, natural gas or oil and allow flames to heat up a heat exchanger in which air or water is forced around the exchanger to absorb the heat and distribute the thermal energy within a conditioned space. Air conditioners or heat pumps use a refrigeration circuit to absorb heat energy from one location and release that thermal energy in another location to heat or cool a conditioned space.

Although recent developments intelligent or learning industry of thermostats has demonstrated some savings by knowing when a conditioned space is occupied at different times or patterns, the efficiency improvement is limited. Further improvements are possible to achieve a more efficient heat recovery system.

SUMMARY OF THE INVENTION

In view of the foregoing, it is an object of the present invention to provide an improved heat recovery system. In one embodiment, the invention is directed to a heat and energy recovery system. According to one embodiment of the present invention, a heat recovery system includes a compressor, a solar panel, and a first heat exchanger and a second heat exchanger in fluid connection to form a fluid circuit. The compressor is configured to facilitate fluid movement in the fluid circuit between the solar panel, the first heat exchanger and the second heat exchanger. The first exchanger and the second heat exchanger function as a condenser and evaporator respectively depending on a cooling cycle or a heating cycle. The solar panel includes a plurality of solar cells connected in parallel, and each solar cell includes a plurality of metal tubes for fluid to pass through. A temperature sensor is mounted within each of the solar cells and configured to measure temperature inside the respective solar cell. Each solar cell is connected to the fluid circuit via a respective pressure valve, and the status of the pressure valve is configured to depend on the measurement of the temperature sensor in the respective solar cell. The solar panel further includes a bypass channel for fluid to bypass the solar panel when all the pressure valves are closed.

According to another embodiment of the present invention, a method of recovering heat and energy includes feeding excess heat and waste products emitted as a result of fuel combustion into a mixing chamber comprising a first heat exchanger coupled with a fluid containing conduit circuit. Air is fed into the mixing chamber for initiating a reaction with the waste products to produce a reaction product with potential energy. Heat energy exchange is effectuated through the reaction product and excess heat interacting with the first heat exchanger, whereby the temperature and pressure of the fluid within the first heat recovery exchanger and conduit circuit increases. The fluid in the conduit circuit is further pressurized by utilizing heat energy from the exhaust gas and waste products emitted from fuel combustion and thermal energy obtained via a solar panel. Heat energy is exchanged by forcing air over a second heat exchanger that is in fluid communication with the pressurized fluid-containing conduit circuit outside the mixing chamber.

According to another embodiment of the present invention, a method of recovering heat and energy includes feeding air into a mixing chamber to effectuate heat energy exchange via interacting with a first heat exchanger in the mixing chamber. Heat energy is exchanged by forcing air over a second heat exchanger outside the mixing chamber that is in fluid communication with the first heat exchanger. Fluid contained in the fluid circuit connecting the first heat exchanger and the second heat exchanger is pressurized using heat energy removed by the first heat exchanger and the second heat exchanger and thermal energy obtained via a solar panel.

These and other objects, aspects and advantages of the present invention will be better appreciated in view of the drawings and following detailed description of preferred embodiments.

BRIEF DESCRIPTION OF THE DRAWINGS

FIG. 19 illustrates another embodiment of a heat recovery system of the present invention incorporating a solar panel in a heating cycle, according to another embodiment of the present invention.

DETAILED DESCRIPTION OF PREFERRED EMBODIMENTS

As illustrated in the accompanying drawings, the present invention is directed to a heat and energy recovery system and methods of using the same. Such heat recovery devices may be adapted for use in a furnace of a heating, ventilation and air conditioning (HVAC) system or any other system where heat energy from fuel combustion is utilized for heating or cooling air spaces.

Figure 1:
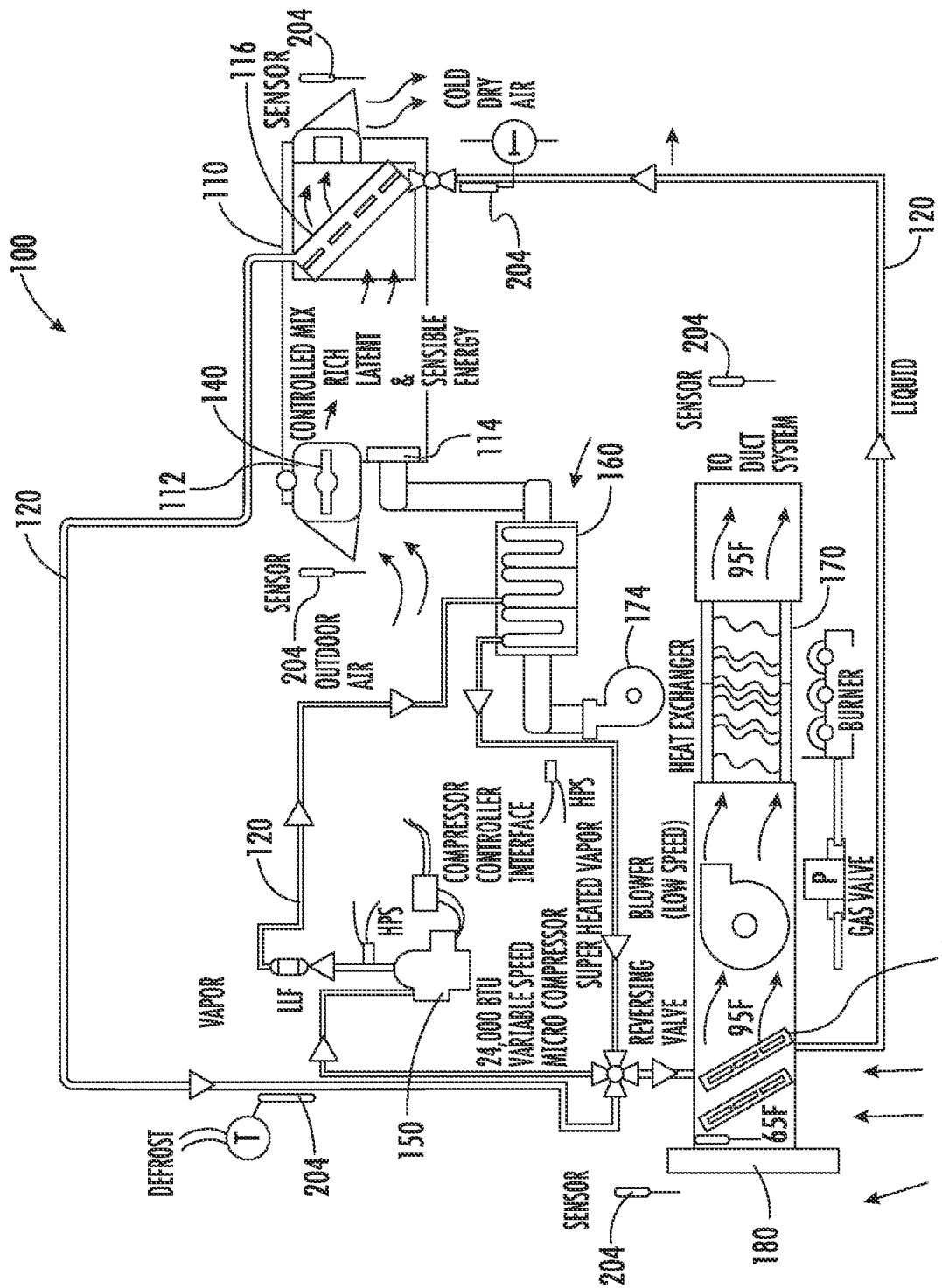
FIG. 1 is an illustration of one embodiment of a heat recovery system of the present invention in a heating cycle.

According to one embodiment of the invention, a heat recovery system 100 in a heating cycle is illustrated in FIG. 1. The system 100 includes a mixing chamber 110, preferably insulated, which includes an air intake 112 and an emissions intake 114 for receiving exhaust gas and waste products emitted from fuel combustion. The mixing chamber 110 may be made from a variety of metals or alloys. Preferably, the insulated chamber 110 is made of stainless steel and titanium alloy.

The system 100 further includes a first heat recovery exchanger 116 contained within the mixing chamber 110. The first heat exchanger 116 is structured for contacting a mixture made up of air introduced via the air intake 112 and exhaust gas and waste products (made up of oxygen starved, carbon emissions) introduced via the emissions intake 114. A coil sensor 204 can also be in contact with the primary heat recovery exchanger 116 to relay any problems with the functionality of the first heat exchanger 116 to a central processing unit (discussed later herein). The first heat exchanger 116 can be made from a variety of metals and alloys that are ideal for heat exchange, such as but not limited to copper, aluminum and the like. The first heat exchanger 116 can be in the form of a hermetically sealed heat recovery coil.

The air intake 112 can be structured as a single intake or multiple intakes. The intake(s) may be adapted to introduce outdoor air, indoor air or both. Additionally, in some embodiments it can be desirable to generate a pressurized environment within the insulated chamber 110. As such, one or more of the air intake(s) 112 can connect to a pressure regulator inducer blower 140 that is part of a pressure equalization system to assist in pressurizing the air inside the mixing chamber 110. The inducer blower 140 can include a variable speed motor that is controlled by sensors that detect proper temperature and/or humidity and/or pressure of the air inside the mixing chamber 110.

The first heat recovery exchanger 116 is further interconnected to a fluid circuit 120 for conveying fluid therein. The system 100 is interconnected to a second heat exchanger 130 outside the mixing chamber 110 such that the second heat exchanger 130 is in fluid communication with the fluid circuit 120. The second heat exchanger 130 and the first heat recovery exchanger 116 are collectively interconnected via the fluid circuit 120 such that the first heat recovery exchanger 116 contacts the mixture made up of air introduced via the air intake 112 and exhaust gas and waste products introduced via the emissions intake 114 within the insulated chamber 110, while the heat extraction exchanger 130 contacts air to be heated outside of the insulated chamber 110.

A compressor 150 is utilized to assist in fluid (e.g., refrigerant) flow between the first heat recovery exchanger 116 and the second heat exchanger 130 via the fluid circuit 120. The heating of cooler refrigerant in the first heat recovery exchanger 116 during the operation of the system 100 results in a pressure increase inside the exchanger and the fluid circuit 120, resulting in heat-absorbed refrigerant being pushed to an area of lower pressure. Such pushing allows a large part of refrigerant flow in the circuit (ca. 50%) to be achieved without any compressor assistance, limiting the amount of electrical energy required; therefore, a large compressor may not be necessary in most embodiments of the system 100 to get sufficient refrigerant flow. A micro-compressor is preferably utilized in embodiments of the invention to increase energy efficiency. The compressor 150 only operates at a speed as needed.

The system 100 can further include a ventilator outdoor air intake 180 that is structured to be in communication with the heat extraction exchanger 130 for heating outdoor air as it is drawn into the supply air intake of a heating apparatus or furnace 170. The ventilator outdoor air intake 180 directs air into the airstream being drawn across the heat extraction exchanger 130 such that it can be heated by the energy efficient process utilized in the heat recovery system 100.

The pressurized vapor is condensed at high pressure and temperature inside the condensing coil of the second heat exchanger 130. During the condensation of refrigerant, heat is released and provided heated air to a HVAC system. The liquid refrigerant is then transported to the evaporation coil of the first heat exchanger 116, which lowers the pressure and goes on to another circle. The flow of refrigerant in the fluid circuit 120 between each of the components of the system is illustrated by arrows in FIG. 1.

Figure 2:
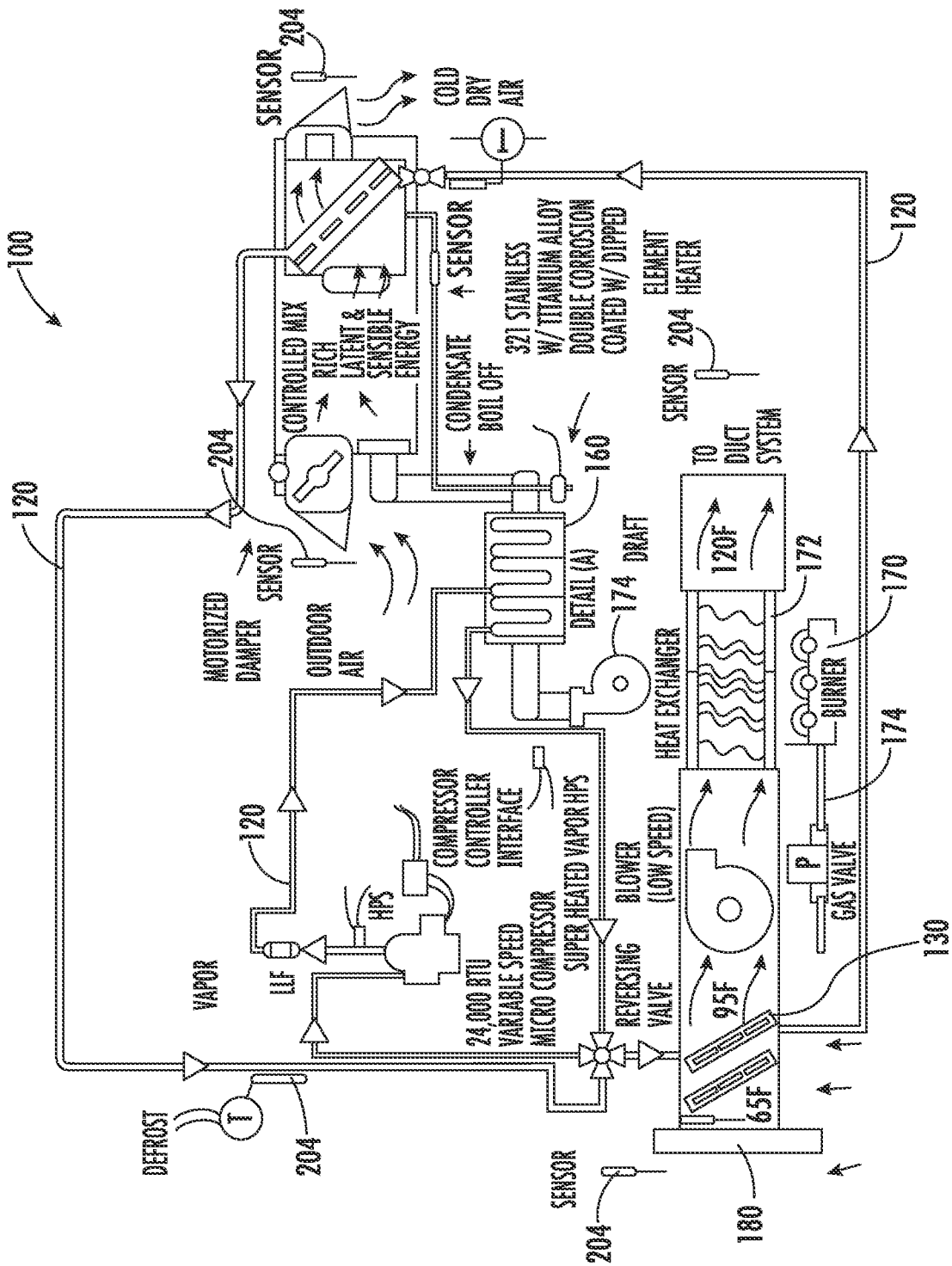
FIG. 2 is an illustration of another embodiment of a heat recovery system of the present invention in a heating cycle.

Referring to FIG. 2, a furnace 170 is used in addition to the compressor 150 described in FIG. 1 in a higher heating demand. In the depicted embodiment, the compressor 150 is configured to pass fluid (e.g., refrigerant) through a first thermal exchange coil 160 heated by exhaust gas and waste product generated by the furnace 170, thereby further increasing refrigerant pressure in the fluid circuit 120. The furnace 170 input exhaust originates from an oil-burning furnace or other type of furnaces such as furnaces burning natural gas sources. The furnace 170 includes a furnace exhaust 172 and a furnace intake 174. The emissions intake 114 is adapted to be in communication with the furnace exhaust 172 of the furnace to receive exhaust gas and waste products resulting from fuel combustion in the furnace 170. A furnace inducer blower 174 can be in connection with the furnace exhaust 172 to actively draw exhaust from the furnace 170 into the emission intake 114 of the mixing chamber 110.

The compressor 150 pumps refrigerant into the second heat exchanger 130 while exhaust gas and waste product generated by furnace 170 pass through metal tubes of the thermal exchange coil 160. The pressurized fluid (e.g., refrigerant) vapor passing through the thermal exchange coil 160 is fed into a condensing coil of the second thermal exchanger 130. Waste heat or flue gas generated by furnace 170 is thus utilized to increase pressure of refrigerant in the fluid circuit 120 and directed into the mixing chamber 110, wherein hot exhaust gas is combined with ambient air to create a rich 40° F. mixture for perfect extraction by the evaporator coil of the first heat exchanger 116. The mixture can be adjusted so that is always around 40° F. by monitoring the entrance of the fresh air entering into the mixing chamber 110.

This mixture passes over the first heat recovery exchanger 116. The fluid (e.g., refrigerant) in the first exchanger 116 can extract a large amount of heat energy from the mixture and transfer the heat energy to the second heat exchanger 130 via the fluid circuit 120 to warm the indoor air.

The exhaust heat energy generated by the furnace 170 dramatically increases the pressure in the refrigerant, enabling the compressor to operate at 50% or less of capacity. In other words, only a fraction of the electricity is used to accomplish the same transfer of thermal energy further downstream in the refrigeration circuit. By using waste energy from furnace 170, the electrical consumption of the compressor 150 can be greatly reduced. In addition, by controlling the outside air introduced to the evaporation coil of the first heat exchanger 116, the efficiency of the compressor 150 can be maximized. The flow of refrigerant in the fluid circuit 120 between each of the components of the system is illustrated by arrows in FIGS. 1 and 2.

The embodiment illustrated in FIGS. 1 and 2 are typically designed for use when the input exhaust originates from the burning of cleaner burning propane or other natural gases, such as but not limited to, a natural gas-burning furnace component of a HVAC unit.

The system 100 uses the waste heat of the furnace heater to boost the pressure in the refrigeration cycle reducing the need for mechanical energy by the compressor. The heat absorbed into the refrigeration cycle is transferred back into the buildings ventilation system. Waste flue gas are used several times in boosting efficiency before being fully absorbed and returning the thermal energy back into the building and greatly increases efficiencies over 100% by way of thermal and mechanical efficiency.

In addition, the system 100 significantly reduces fossil fuel use, as the condensing coil of the second heat exchanger utilizes the thermal energy absorbed from the flue gas and environmental air mixture. The condensing coil of the second thermal exchanger 130 releases heat into the ventilation system prior to the furnace heat exchanger. As a result, instead of heating the furnace from 65° F. and return air to 120° F., the furnace heat exchanger only needs to heat the air from 95° F. to 120° F., thanks to the condensing coil of the second heat exchanger 130, which utilizes heat from waste heats in several respects.

The system 100 could be adapted to attach to any type of furnaces, resulting in an increased efficiency of the system. Carbon discharge, emission temperature, and humidity may also be reduced if the system 100 is utilized with a furnace.

Figure 3:
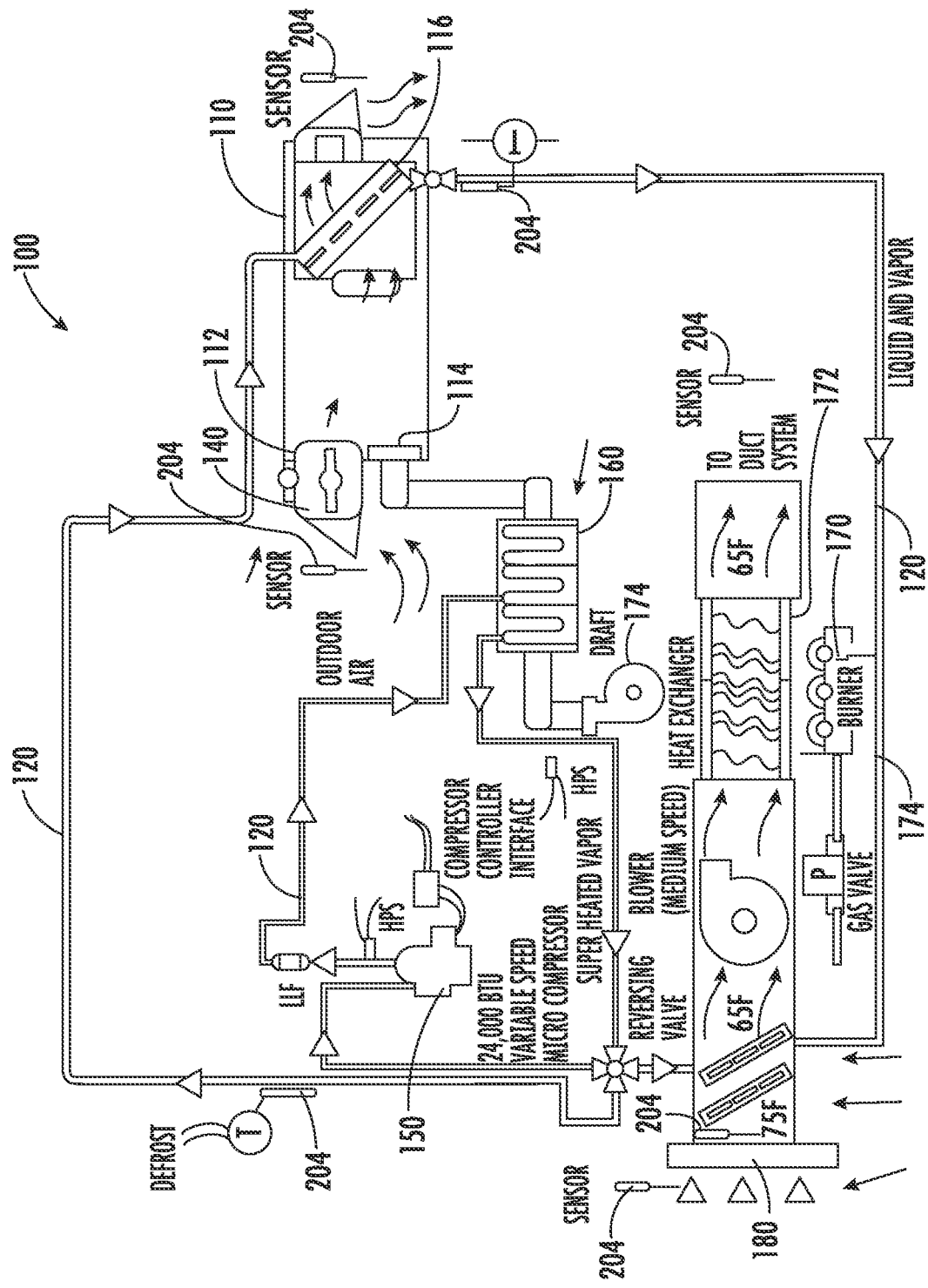
FIG. 3 is an illustration of another embodiment of a heat recovery system of the present invention in a cooling cycle.

Referring to FIG. 3, similar to the heating cycles depicted in FIGS. 1 and 2, a compressor 150 utilizes waste heat to pressure refrigerant flow in a cooling cycle. The same benefits apply in the cooling cycle as mentioned in the stage heating cycle. In this scenario, the first heat exchanger 116 includes a condensing coil and the second heat exchanger 130 includes an evaporation coil.

In this scenario, the compressor 150 pumps the refrigerant through the condensing coil of the first heat exchanger 116 in the mixing chamber 110 and releases heat absorbed from an indoor environment. Fluid (i.e. refrigerant) in the fluid circuit 120 is then passed through an evaporation coil of the secondary heat exchanger 130 in which heat from a building is passed over to the refrigerant and raised its pressure on a high-pressure side of the system. The refrigerant exiting the evaporation coil in the second heat exchanger 130 is then passed through the compressor 150 in which further increases the refrigerant pressure before entering the first heat exchanger 116 for another fluid moving cycle.

Figure 4:
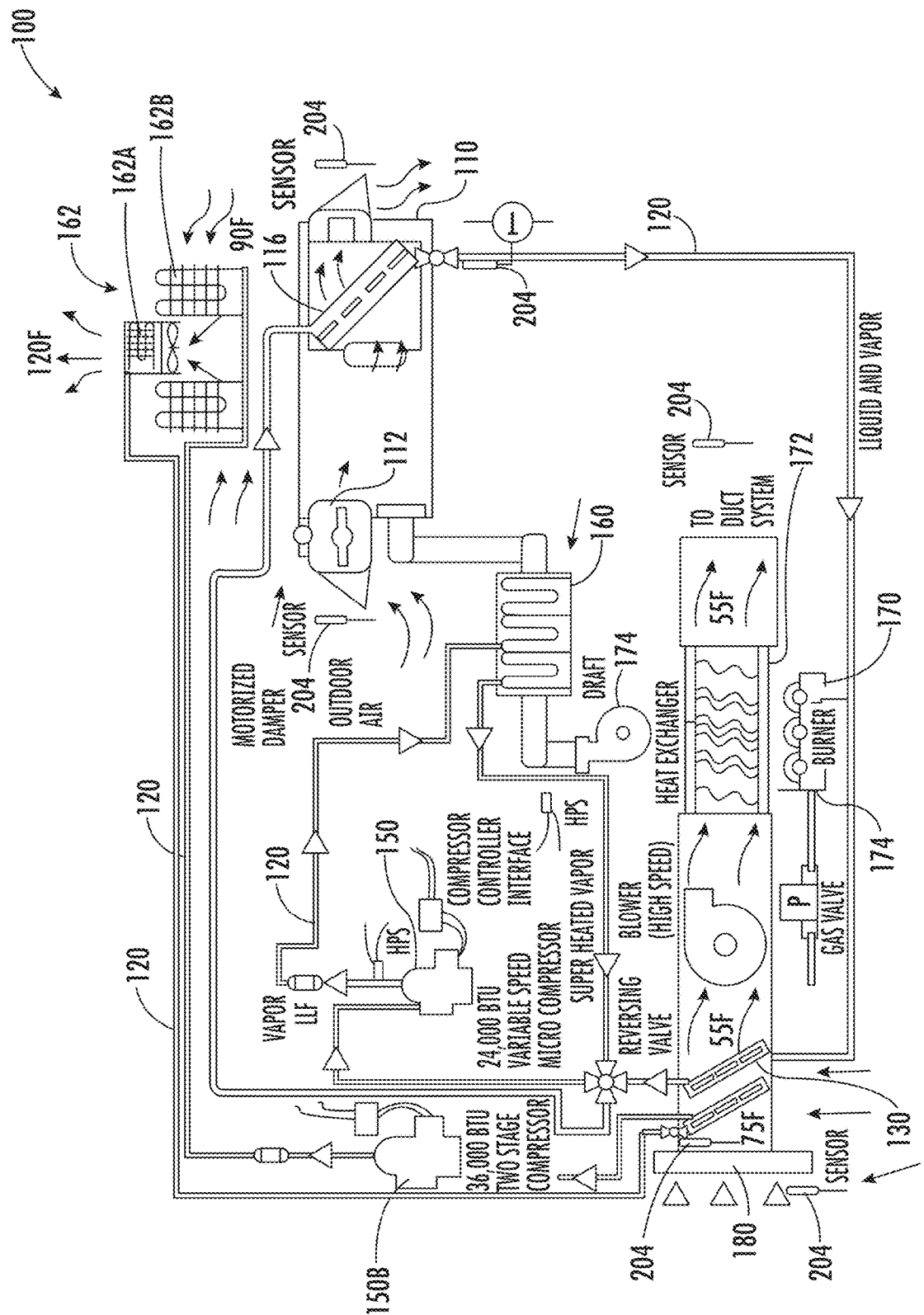
FIG. 4 is an illustration of another embodiment of a heat recovery system of the present invention in a cooling cycle.

Referring to FIG. 4, in a high demand period during a cooling cycle, a second compressor 150B (e.g., a two-stage compressor) is used in addition to the compressor 150 configured to pump refrigerant through the condensing coil of the first heat exchanger 116 in the mixing chamber 110, as described in FIG. 3. The second compressor 150B pumps the refrigerant through a second heat exchange coil 162. In this scenario, the heat removed from the indoor environment is passed through a first portion 162A of the second heat coil 162. A second portion 162B of the second heat exchange coil 162 is configured to pass through fluid exiting the second compressor 150B to absorb heat obtained by the first portion 162B of the second heat exchange coil 162, via, for example, thermal radiation and/or convection. As such, the heat from the indoor environment is passed over to the refrigerant connected to the second compressor instead of being released to the outdoor environment. All the absorbed heat is then released in the first heat exchanger 116 though the refrigerant, the cooled refrigerant is passed through evaporation coils of the secondary heat exchanger 130, and the next cycle commences.

The heat recovery system 100 utilizes what would be wasted or discharged heat in a conventional HVAC system to increase the pressure within the refrigeration cycle, which in turn decreases the electrical consumption of the compressors 150 and 150B to achieve 100% heat transfer. The compressor 150 and 150B can operate at 50% or less of capacity and still achieve 100% of heat transfer.

The system 100 can also employ artificial intelligence (AI) to monitor and control one or more components of the system. AI can be used to optimize control of the operation parameters of the variable-speed compressors, multi-speed blowers and fans, heat exchanger mixing components, motorized dampers and other components of the system.

Figure 5:
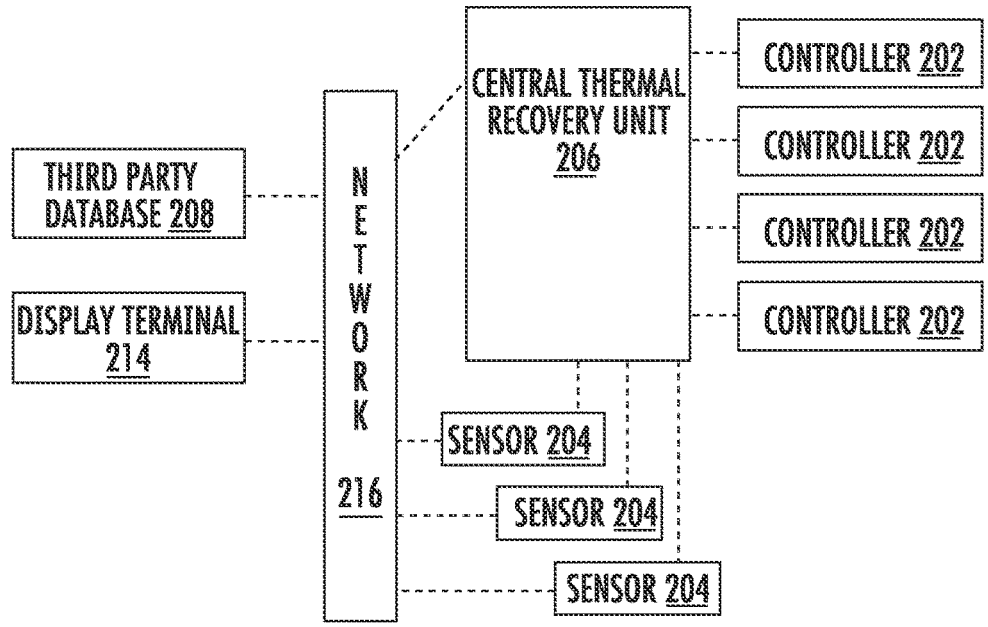
FIG. 5 is a block diagram of a heat recovery system employing a central thermal recovery unit.

Referring to FIG. 5, in accordance with another embodiment of the present invention, the system includes at least one controller 202 operably linked to respective operating components (e.g., and/or operating zones) of the heat recovery system. For example, the operating components coupled to the at least one controller 202 includes a compressor (e.g., compressor 150), a heat exchanger coil (e.g., a condensing coil, an evaporating coil), a fan, a motor, a valve and other functional components described in FIGS. 1-4.

The system 100 also includes at least one sensor 204 configured to collect at least one environmental measurement and system-related data. The environment measurement and the system-related data can include internal and external temperature and pressure, humidity, barometric pressure, dew point, wind direction, sun peak and angle, annual precipitation, geographical location and elevation of the system, thermostats setting, chemical analysis at specific point of the system, carbon dioxide level, motion level, fuel consumption, electrical consumption, fuel price, and electrical energy price in real time.

The system 100 further includes a central thermal recovery unit 206 in signal communication with the at least one controller 202 and the at least one sensor 204. The central thermal recovery unit 206 is configured for determining an operating instruction based on the at least one environmental measurement and system-related data received from the at least one sensor. The central thermal recovery unit 206 is further configured to transmit the operating instruction to the at least one controller 204. The operating instructions includes a specific operation sequence of a series of operating components/zones controlled by the at least one controller.

The central thermal recovery unit 206 can also be configured for operating instructions to be based on environment measurements and system-related data retrieved from a third-party database 208. For example, the third-party database 208 can include information such as weather conditions, user-preferred comfort level, fuel cost, air quality, and the like. The information can facilitate the central thermal recovery unit 206 to determine a set of operating instructions that will improve the efficiency and extend the life of the equipment and components of the system.

The at least one controller 202 and/or the at least one sensor 204 can also be used to detect potential issues concerning certain mechanical parts and/or zones of the system and transmit these issues to the central thermal recovery unit 206. For example, the at least one controller 202 and/or the at least one sensor 204 can detect a depleted refrigerant and/or a leak at a specific location within the system. The central thermal recovery unit 206 can in turn determine parts in need of repair or replacement and repair or replacement sequences.

The central thermal recovery unit 206 can be configured to determine the operating instructions (e.g., temporal operating sequence) using an adaptive learning method. For example, the central thermal recovery unit 206 can record and analyze operation patterns, compare the efficiencies of each operation pattern, and on this basis predict the most efficient sequence under certain environmental/system conditions. The adaptive learning method will make the heat recovery system more efficient from the continuous determination and implementation of a more efficient operation pattern. The central thermal recovery unit 206 will enable a conventional HVAC system to achieve dramatically higher efficiency levels. As an example, the operation pattern can include motor running time, internal and external temperature and pressure, fuel combustion rate, fan speed and duration, inducer flow level, blower pressure and speed, ignition timing, and the like. The operation patterns that result in high efficiency can then be transmitted and shared with other thermal recovery units via a network.

The central thermal recovery unit 206 can be configured to achieve the highest system efficiency under given conditions. For example, if the price of fuel depends on the time of day, the central thermal recovery unit can account for fuel price to calculate system efficiency. As another example, for a system that can operate on certain cycles of either refrigeration or fossil fuels, if electric prices are more advantageous than natural gas at a certain time of the day, the system can favor operational cycles that use electricity over natural gas at that time of the day.

The central thermal recovery unit 206 can also be configured to achieve a balance between high system efficiency and low thermal pollutant release. For example, for a heat recovery system located in certain valleys in certain states, for instance, Simi Valley, California, the release of a certain pollutant will contribute to smog accumulation. In such cases, the system can be configured to monitor the release of $CO/CO_2$ and other system waste products and to balance energy consumption, system efficiency and materials release accordingly.

As another example, for a refrigeration system, the central thermal recovery unit 206 can be programmed to collect operating data and environmental data of the system on a periodic basis and respond with operating instructions. The operating instructions can include a sequence and duration for operating a compressor, an evaporator, a condenser and a pressure device. Slight changes in the operating times and pressures of specific components will increase the efficiency of heat transfer and decrease the stress on system components. Subtle changes in the operation of each component under specific internal and external conditions can lead to significant improvements in the ability of the system to extract and transfer thermal energy.

Figure 6:
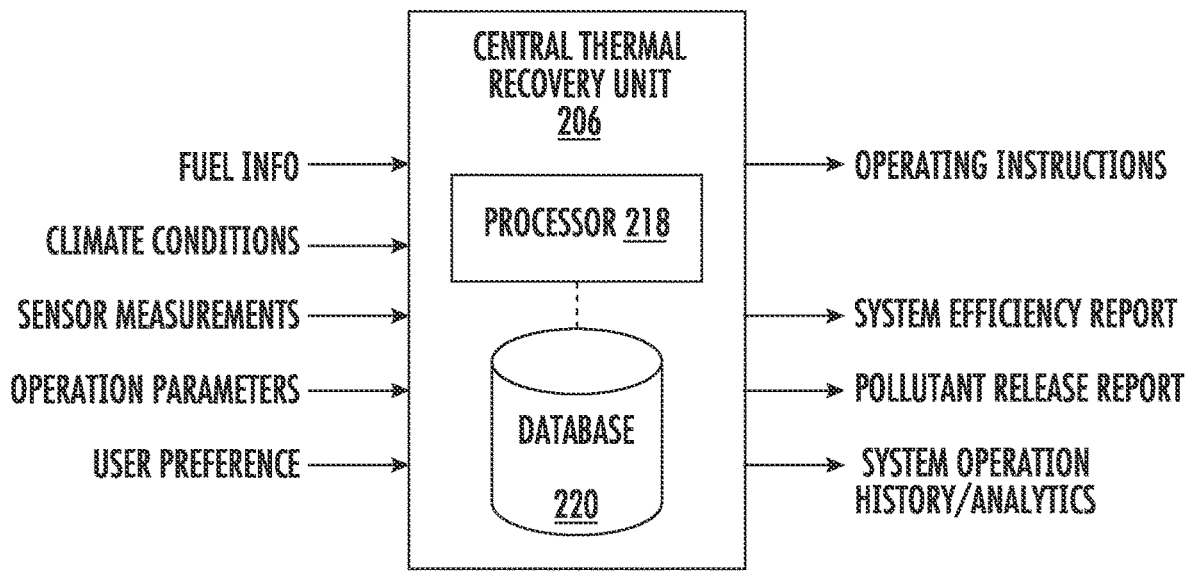
FIG. 6 is a block diagram illustrating the central thermal recovery unit of FIG. 5.

Referring to FIG. 6, the central thermal recovery system 206 includes a processor 218 for receiving and processing system related data such as operation parameters, sensor measurements, climate conditions and fuel information (e.g., fuel price, fuel consumption, etc.) and user preferences. The processor 218 can also be configured to output information such as operating instructions, system efficiency report, system pollutant release report, system operation history and analysis, and the like. This information can be stored in the database 220.

Figure 7:
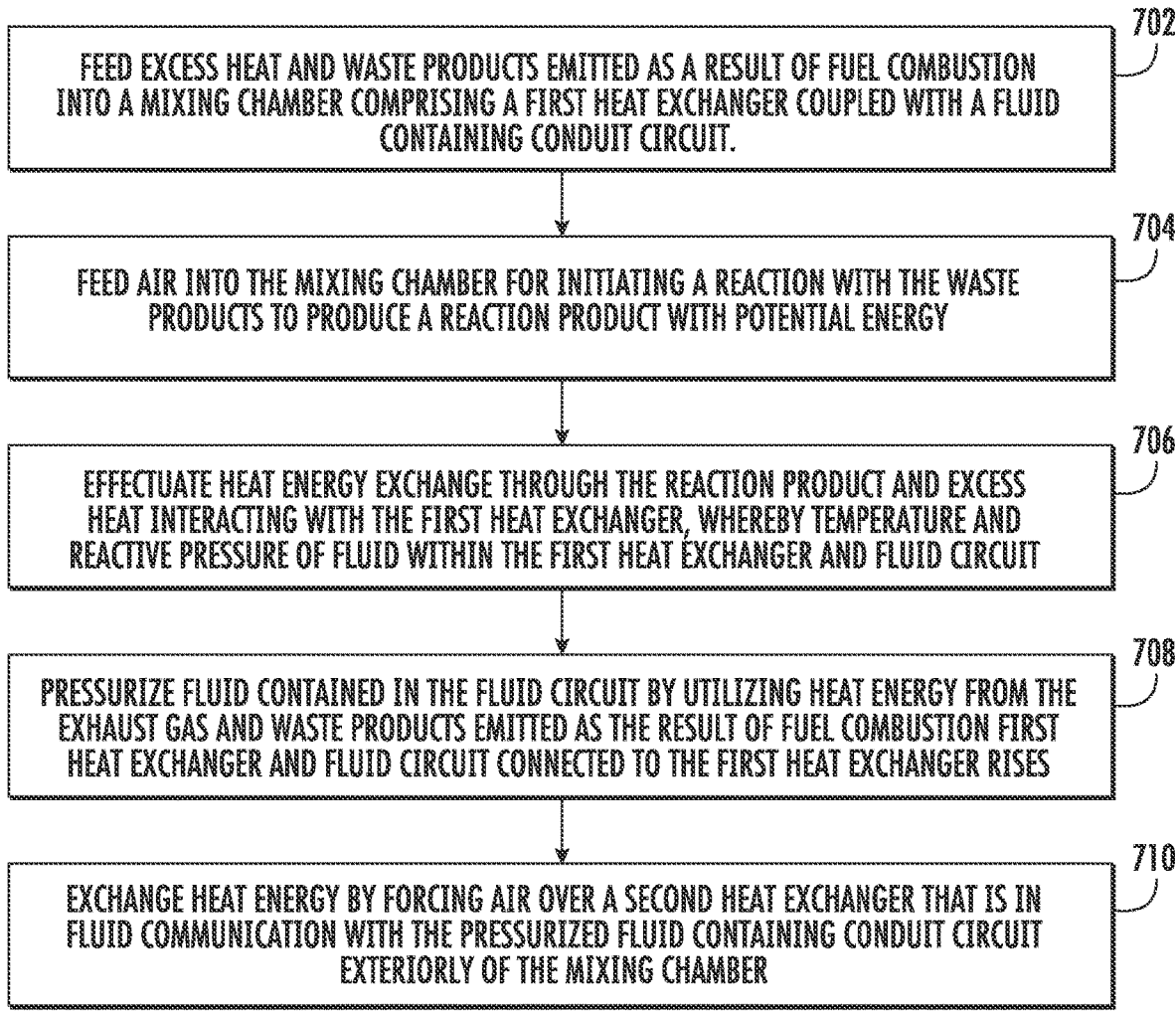
FIG. 7 is a flowchart illustrating a method of recovering heat and energy according to one embodiment of the present invention.

Referring to FIG. 7, according to one embodiment of the present invention, a method for recovering heat and energy includes, at step 702, feeding excess heat and waste products emitted as a result of fuel combustion into a mixing chamber (e.g., mixing chamber 110) having a first heat exchanger (e.g., first heat exchanger 116) coupled with a fluid containing conduit circuit (e.g., conduit circuit 120).

At step 704, air is fed into the mixing chamber for initiating a reaction with the waste products to produce a reaction product that includes heat energy.

At step 706, heat energy exchange is effectuated through the reaction product and excess heat interacting with the first heat exchanger (e.g. first heat exchanger 116), whereby the temperature and the pressure of fluid within the first heat exchanger and the fluid circuit connected to the first heat exchanger rise.

At step 708, fluid contained in the fluid circuit is pressurized by utilizing heat energy from the exhaust gas and waste products emitted as the result of fuel combustion. Specifically, a compressor (e.g., compressor 150) is configured to pass fluid (e.g., refrigerant) through a first thermal exchange coil (e.g., the first thermal 160) heated by exhaust gas and waste product generated by the furnace 170, thereby further increasing refrigerant pressure in the fluid circuit 120.

At step 710, heat energy is exchanged by forcing air over a second heat exchanger (e.g., second heat exchanger 130) that is in fluid communication with the pressurized fluid containing conduit circuit outside the mixing chamber (e.g., mixing chamber 110).

Figure 8:
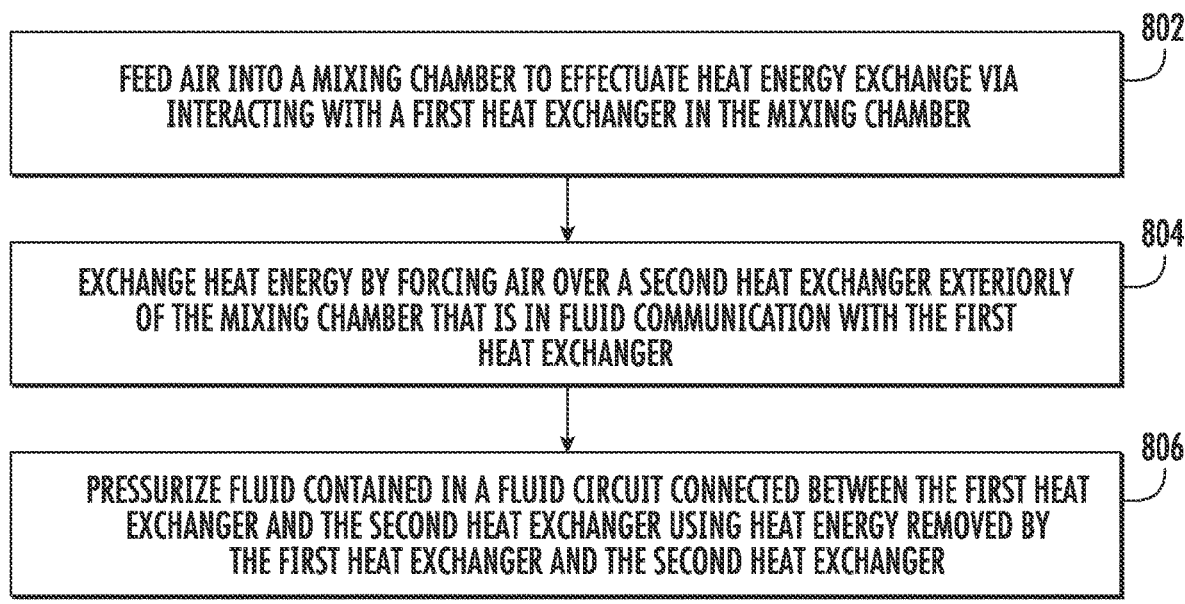
FIG. 8 is another flowchart illustrating a method of recovering heat and energy according to another embodiment of the present invention.

Referring to FIG. 8, according to another embodiment of the present invention, a method for recovering heat and energy includes, at step 802, feeding air into a mixing chamber to effectuate heat energy exchange via interacting with a first heat exchanger in the mixing chamber.

At step 804, heat energy is exchanged by forcing air over a second heat exchanger exteriorly of the mixing chamber that is in fluid communication with the first heat exchanger.

At step 806, fluid contained in a fluid circuit connected between the first heat exchanger and the second heat exchanger is pressurized using heat energy removed by the first heat exchanger and the second heat exchanger from an indoor environment. For example, a second compressor (e.g., compressor 150B) and a second heat exchange coil (e.g., 162) are used to recapture heat removed from the indoor environment. Specifically, heat removed from the indoor environment is configured to pass through the second heat exchange coil and in turn heating fluid flowing through the second compressor. As shown in FIG. 4, a first portion (e.g., 162A) of the second heat exchange coil is configured to be heated by the heat removed from the indoor environment, and a second portion (e.g., 162B) of the second heat exchange coil is configured to pass through fluid exiting the second compressor to absorb heat obtained by the first portion (e.g., 162A) of the second heat exchange coil.

Figure 9:
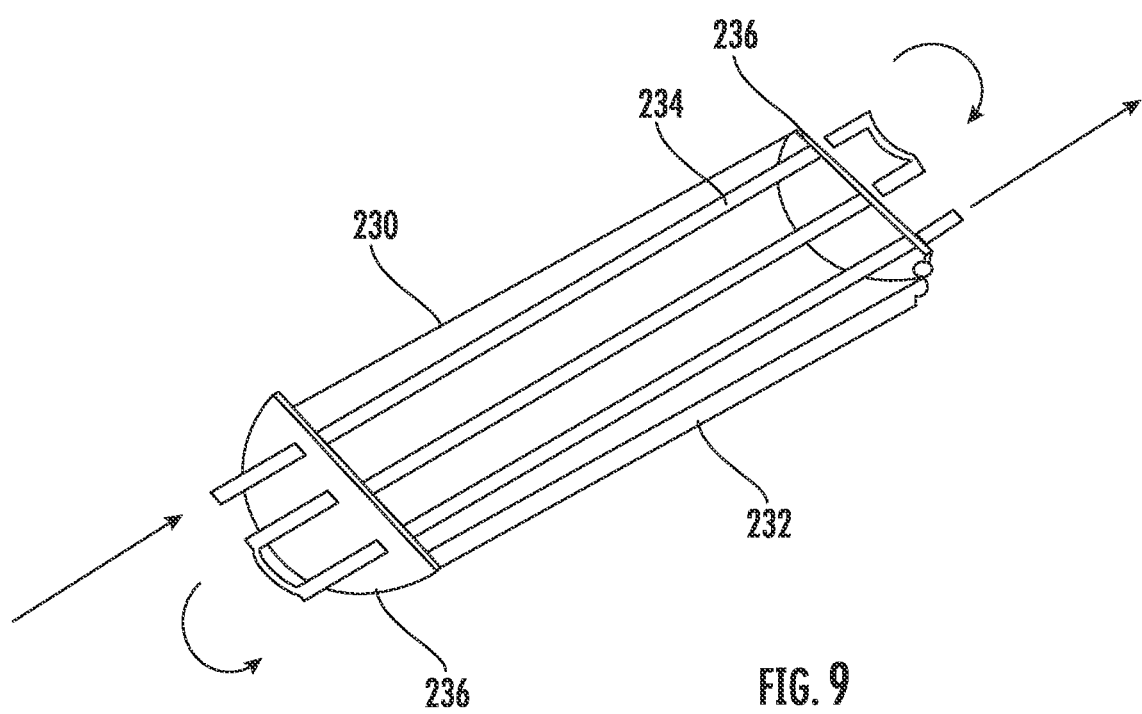
FIG. 9 is an example solar thermal cell of the present invention.

Solar energy can be included in the HVAC system 100 and thus further increase system efficiency. FIG. 9 depicts an example of a solar cell that is useful for the purpose. The solar cell 230 includes a plurality of metal tubes (e.g., copper tubes) 234 arranged in parallel inside a casing 232. Tubes 234 are designed for fluid (e.g., refrigerant) to pass through. The casing 232 is depicted as having a half-round shell base made of metal or plastic and a glass top. Reflective sheets are placed between the casing 232 and the plurality of tubes 234, which are placed between grommets 236 mounted on both ends of the casing 232 to prevent the tubes 234 coming into direct contact with the casing 232 and thus eliminate impact from vibration. The plurality of tubes 234 can be sprayed with a dark blue coating to resist corrosion. Refrigerant pumped by a compressor (not shown) can pass through the plurality tubes 234 and absorb thermal energy from the Sun. Refrigerant flows into the plurality of tubes 234 at one end of the solar cell 230 and out of the tubes 234 at the other end of the solar cell 230. The refrigerant absorbs thermal energy when moving along the tubes 234, increasing the temperature and therefore the pressure of the refrigerant and reducing the electrical energy requirement of the compressor.

Figure 10:
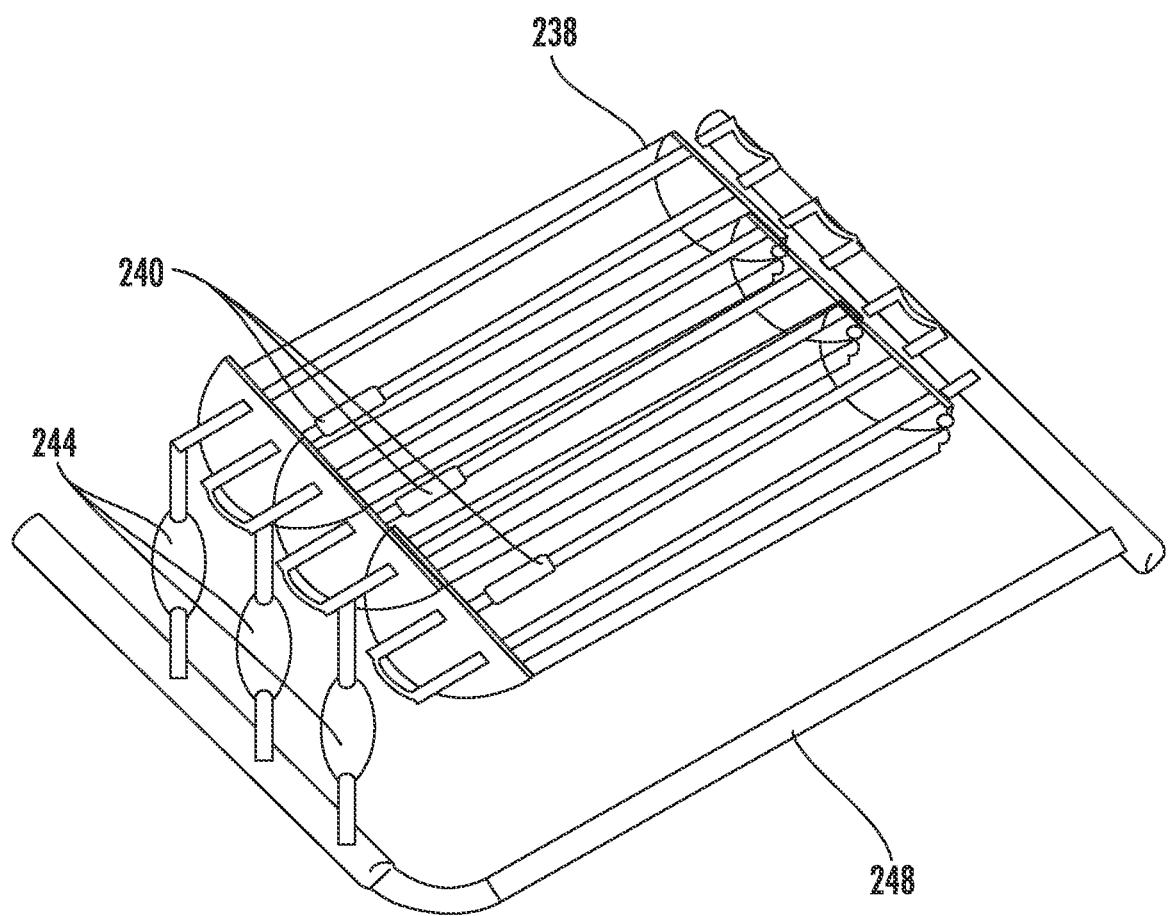
FIG. 10 is an example solar panel have a plurality of solar thermal cells.

FIG. 10 illustrates a solar panel 238, which comprises three solar cells 230 connected in parallel. When the solar panel 238 is placed in direct sunlight, solar energy is utilized when the temperature of the solar cells 230 exceeds a certain level. Specifically, each solar cell 230 has a temperature sensor 240 attached to its respective copper tubes 234. Each temperature sensor 240 is configured to determine the temperature within the respective solar cell 230. Respective pressure valves 244 are coupled between respective three solar cells and a compressor (not shown). The status (e.g., open and closed) of a pressure valve 244 is determined by the measurement of the respective temperature sensor 240. When the temperature in a solar cell exceeds the thermal energy needed to increase the refrigerant pressure to above a pressure threshold, the respective pressure valve 244 connected to the specific solar cell will open, allowing refrigerant to flow inside and absorb solar thermal energy. The solar thermal energy will increase the pressure to supplement the compressor, using less mechanical energy and less electrical energy. A bypass 248 is also placed in parallel with the solar panel when none of the solar cells 230 of the solar panel can supplement solar energy to the heat recovery system. The solar cells 230 can be other shapes (e.g., square) and includes many more metal tubes than depicted. This would allow more refrigerant heating by the sun. Additionally, the solar cells would allow two or more small heat sinks running alongside of the respective solar cells to increase heat retention.

Figure 11:
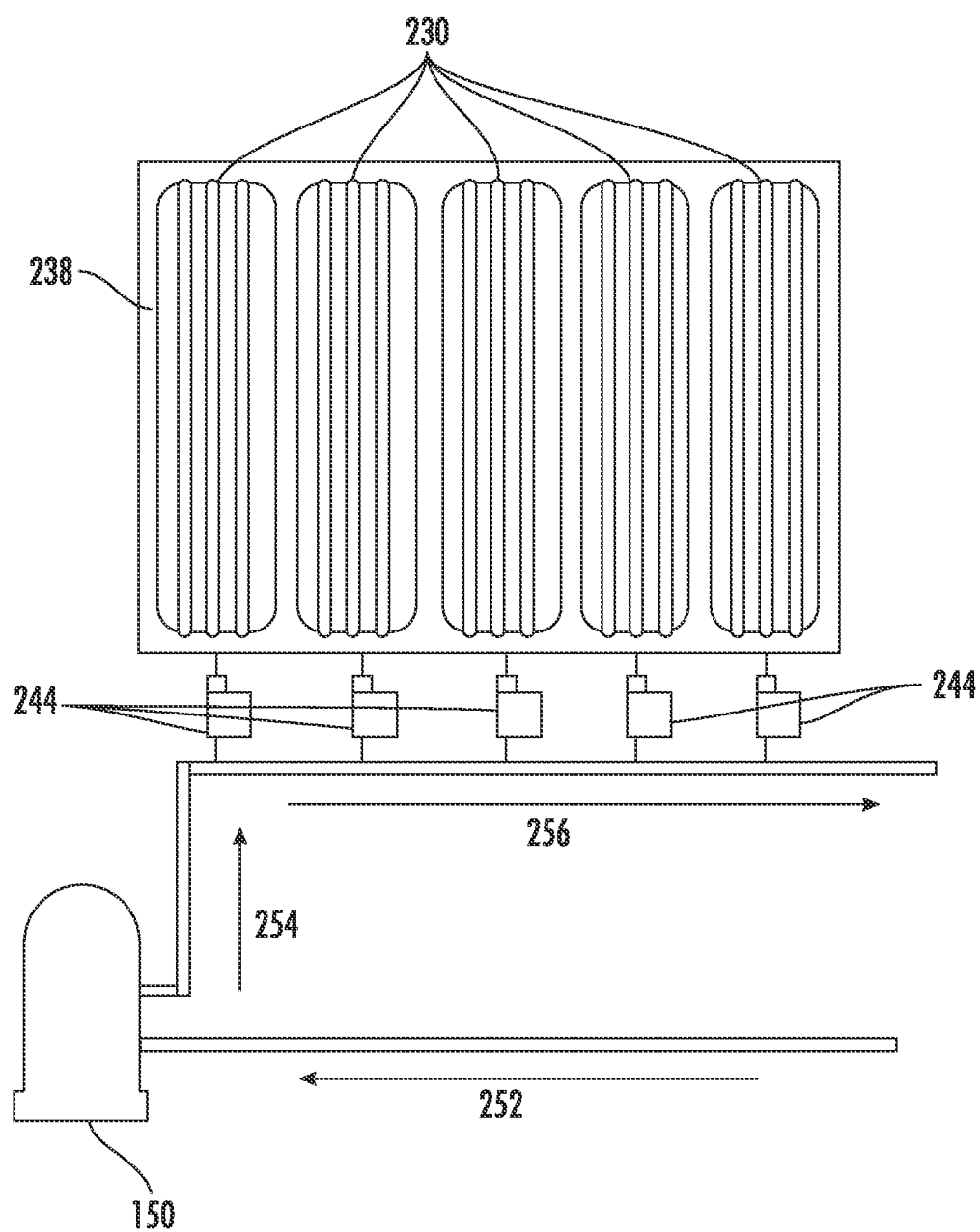
FIG. 11 is an example solar panel connected to a compressor of a heat recovery system.

FIG. 11 shows a solar panel 238 connected to a compressor 150 of a heat recovery system. Arrow 252 shows cold, low-pressure refrigerant flowing into the compressor 150. Arrow 254 shows warm, high-pressure refrigerant flowing out of the compressor 150. Arrow 256 shows warm, high-pressure refrigerant absorbing solar thermal energy from solar cells 230 and further increasing refrigerant temperature and pressure, and thus decreasing the consumption of electrical and mechanical energy.

Figure 12:
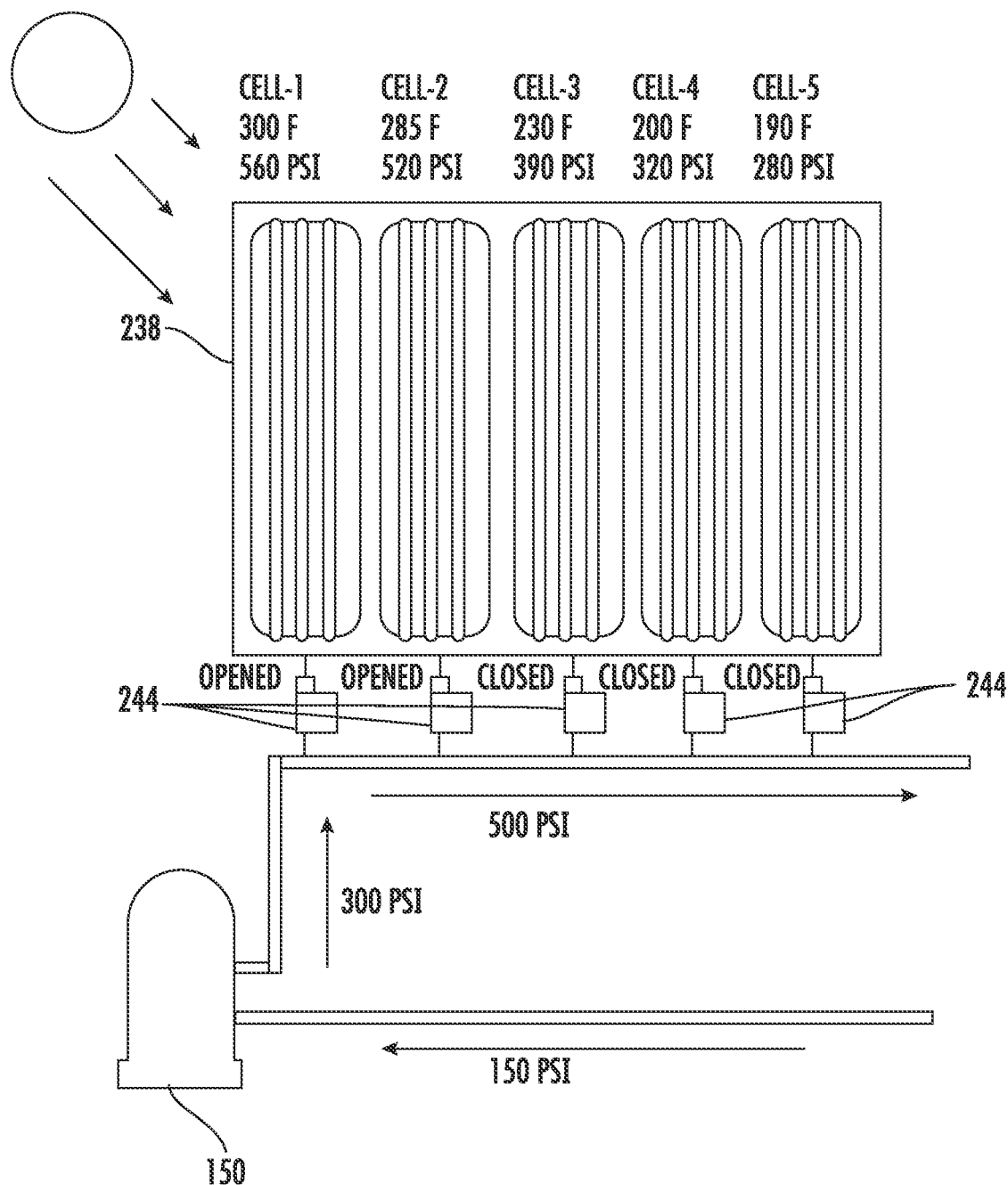
FIGS. 12-14 illustrate examples of exposure of a solar panel to the sun at different time of a day.

FIG. 12 depicts an example of a "morning" position. The Sun's rays are concentrated on a side angle of a solar panel 238, causing more direct sunlight to fall on the two cells on the left side than the others. As a result, the temperature rises substantially on the left side of the solar cells 230 of the solar panel 238, the two respective pressure valves 244 on the left side become open, and the pressure of the refrigerant flow therethrough rises, facilitating the compressor 150 to increase the pressure on the high side of the fluid circuit. The three pressure valves 244 on the right are closed.

Figure 13:
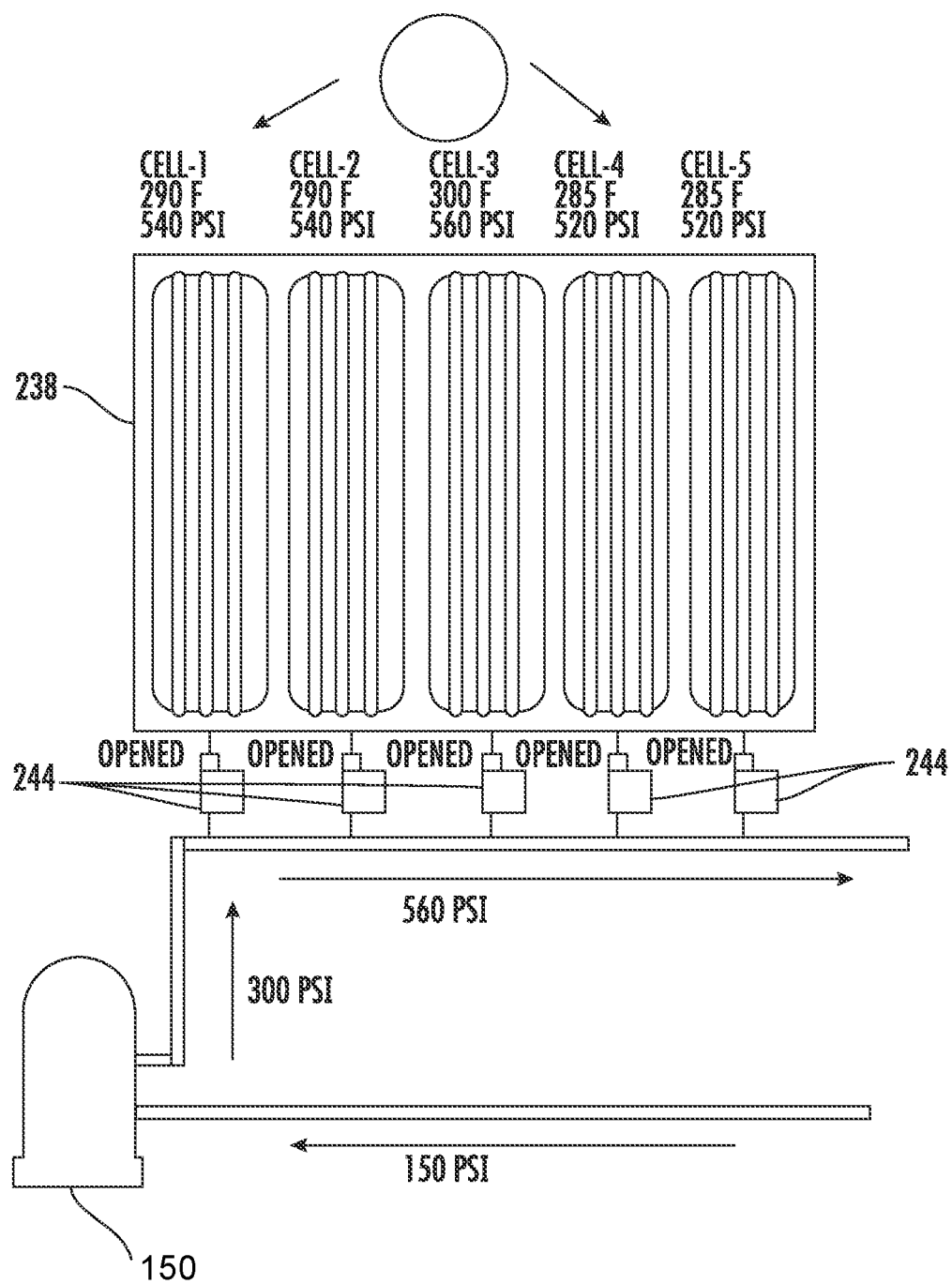

FIG. 13 illustrates a typical day. The Sun has risen directly above the solar panel 238, and each solar cell receives direct sunlight. The temperature in each cell is elevated, and all the respective pressure valves 244 are open. The thermal energy absorbed by each solar cell increases the pressure of the refrigerant, dramatically lowering the operation speed of the compressor 150 needed to achieve the same level of heat transfer when the compressor 150 is operated without the benefit of thermal energy. This significantly increases the efficiency of the entire system in both heating and cooling modes.

Figure 14:
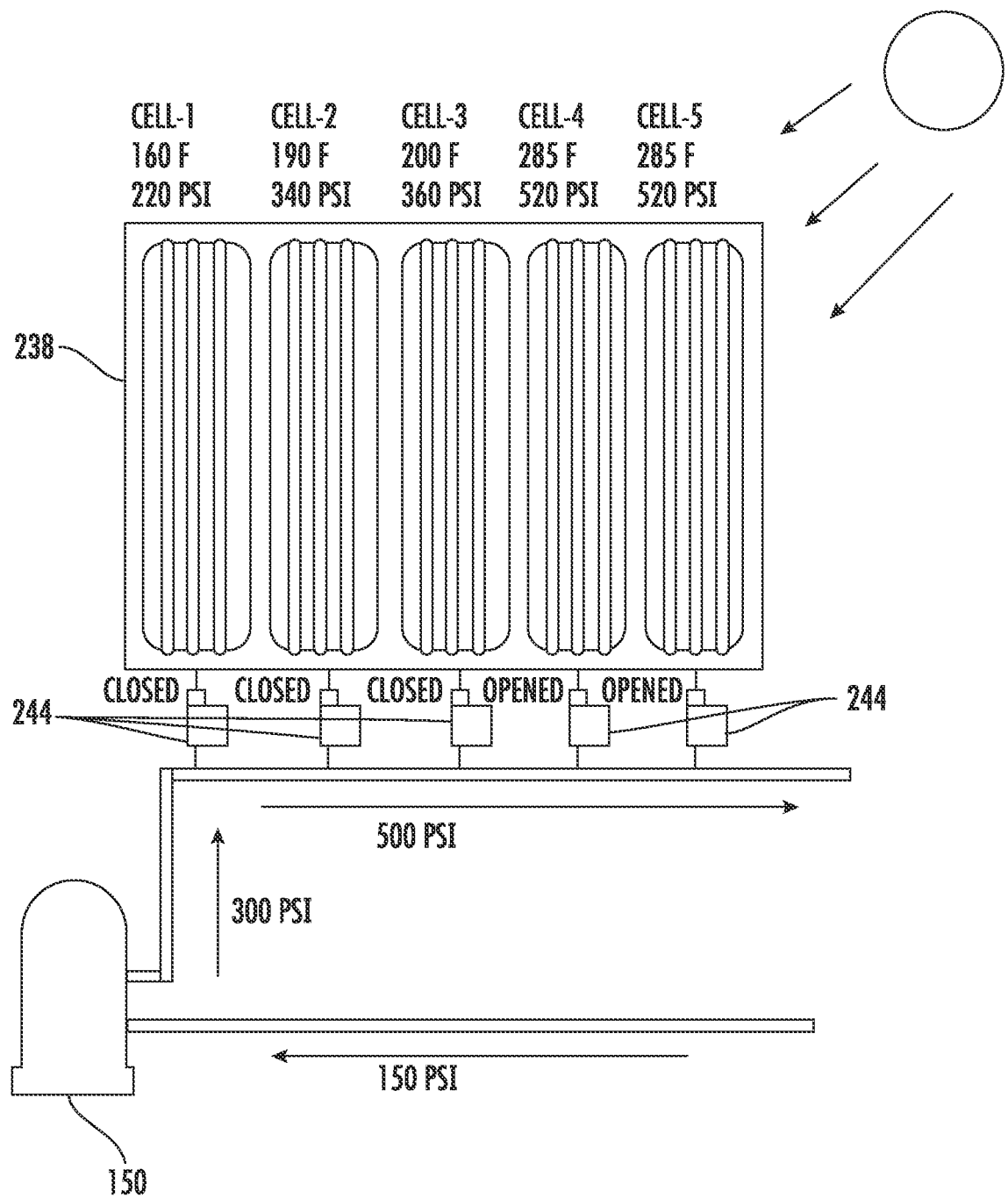

FIG. 14 shows a typical late afternoon. The angle of the Sun is such that certain pressure valves 244 are open, allowing interaction with a refrigeration circuit of a heat recovery system. The pressure valves 244 of three solar cells on the left side are closed, and two pressure valves 244 on the right side are open, assisting the compressor 150 to increase the pressure of the refrigerant.

Figure 15:
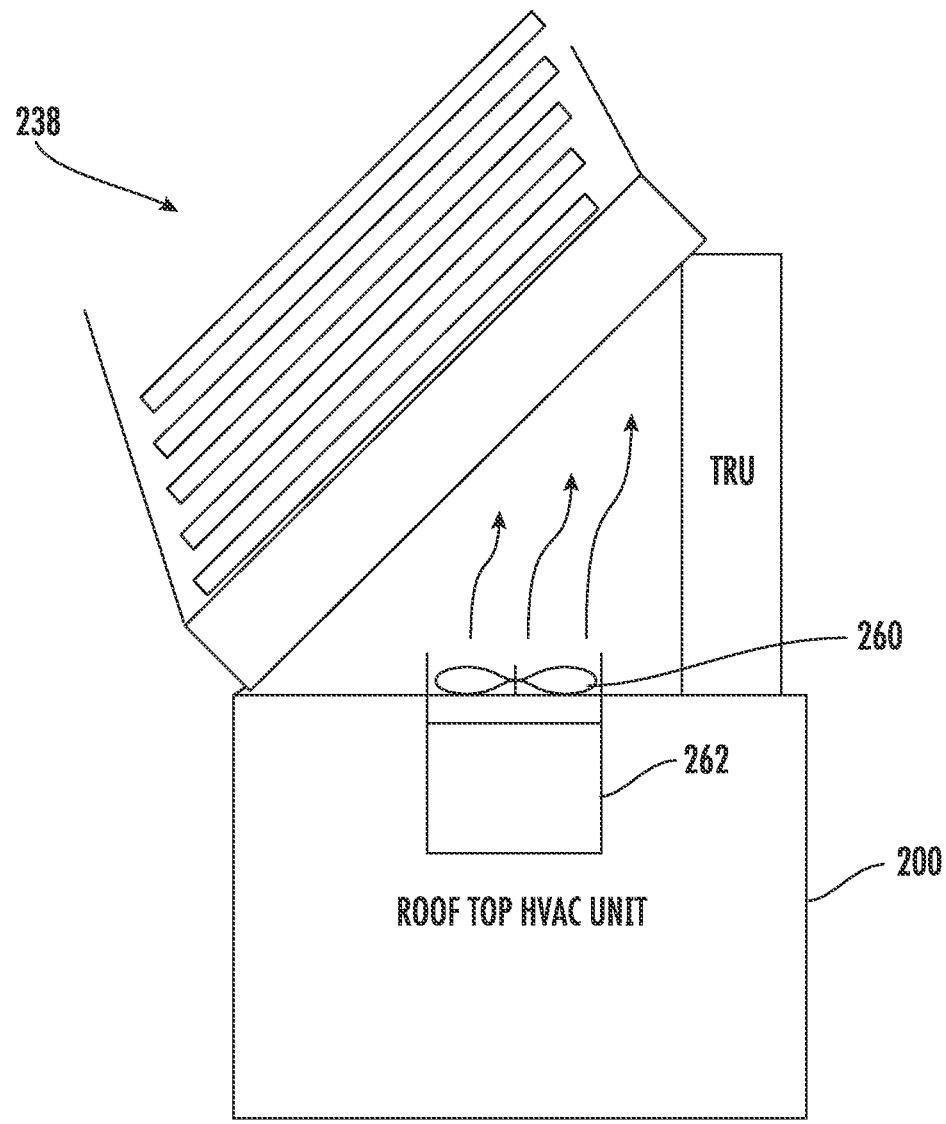
FIG. 15 illustrates a solar panel interacting with a roof top unit of a heat recovery system, according to one embodiment of the present invention.

FIG. 15 depicts the solar panel 238 interacting with a rooftop unit of a heat recovery system. In the depicted embodiment, a condenser fan 260 of the heat recovery system extracts heat from an outdoor condenser coil 262 and transfers it to the solar panel 238 via convection. As such, heat normally released to the surroundings and wasted is thus used to heat the solar panel 238. The outdoor condensing fan would drastically reduce the necessity for the furnace to operate and produce the same amount of thermal delivery. This would reduce greenhouse gas emissions and reduce utility cost of operation.

Figure 16:
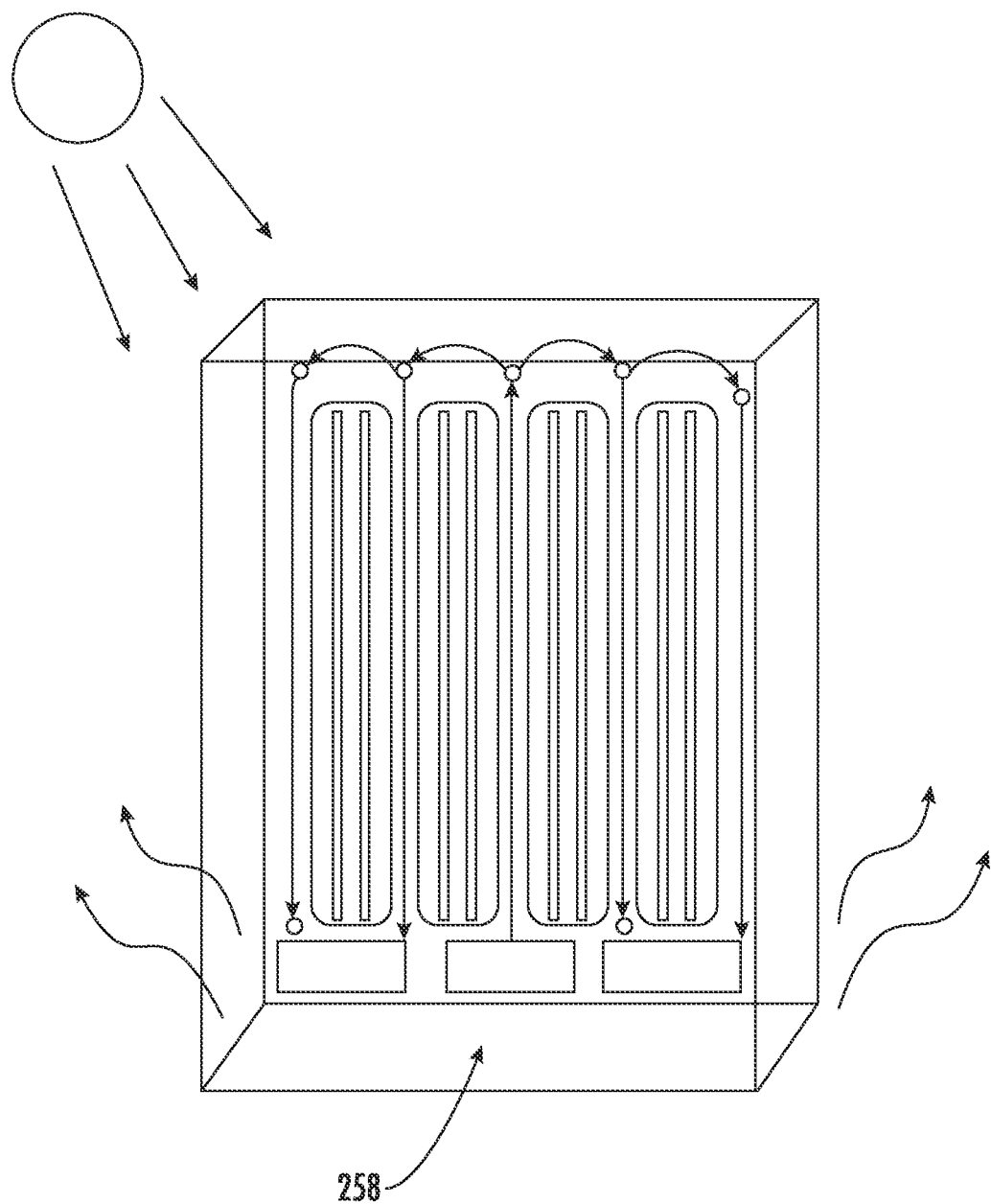
FIG. 16 illustrate a detailed view of a solar panel interacting with a roof top unit of a heat recovery system, according to one embodiment of the present invention.

FIG. 16 is a detailed view of air flow from the condenser fan 260 through the solar panel 238. Warm air inducted by the condenser fan (not shown) is pushed into one side 258 in the solar panel 238, where the air warmed by waste heat warms the cells and moves the heat collected by the solar cells evenly throughout the solar panels, including solar cells that are not directly in the rays of the Sun at that moment. The heat of each solar cell is thus evenly distributed among solar cells, in case exposure to the Sun results in heating one area more than another. This also helps to prevent any boiling of refrigerant due to concentrated heating in one area of the solar panel 238. The heat from the condensing coil is then pushed through the sides of the system and out into the surrounding environment.

Figure 17:
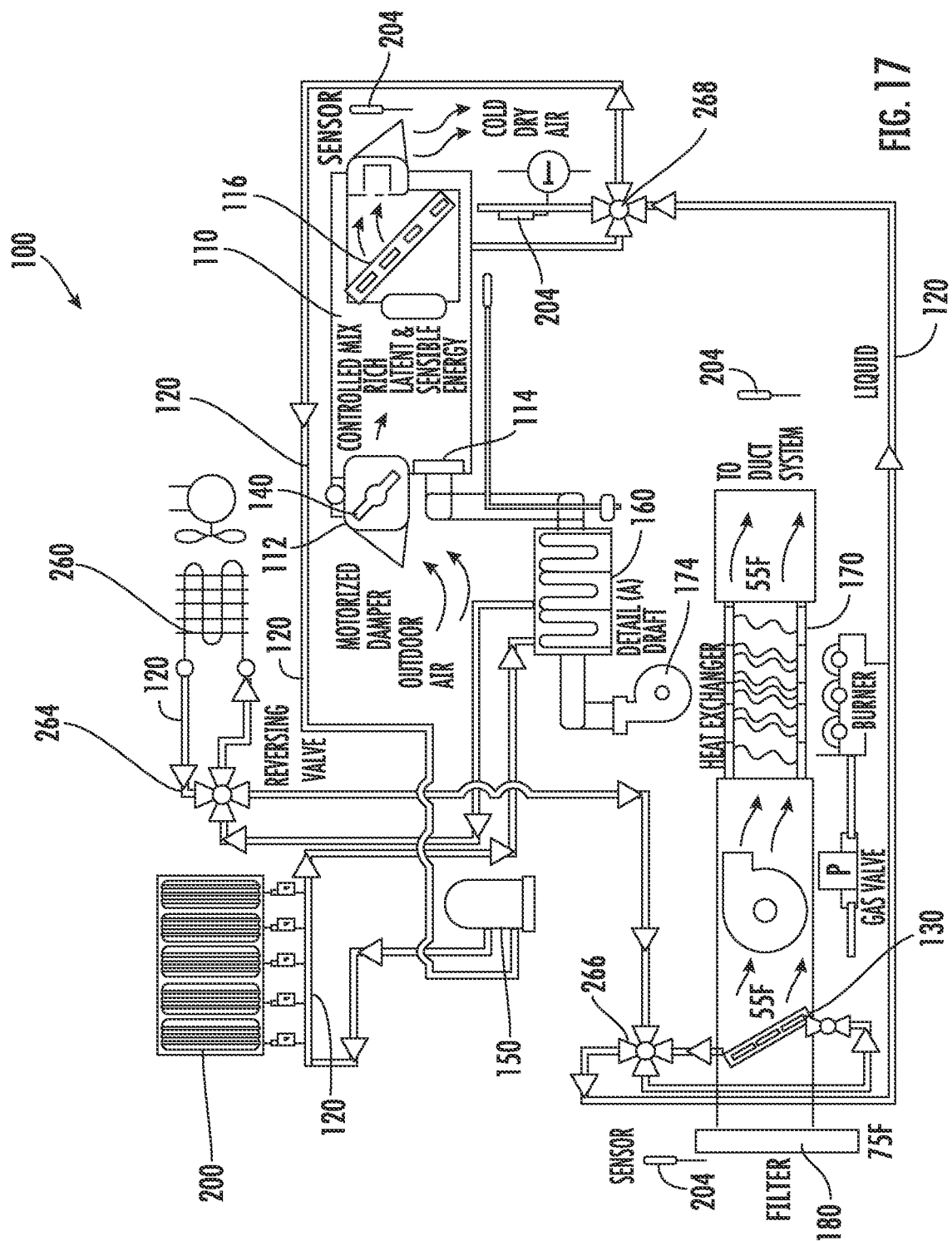
FIG. 17 illustrates an embodiment of a heat recovery system of the present invention incorporating a solar panel in a cooling cycle, according to one embodiment of the present invention.

FIG. 17 illustrates a thermal recovery system incorporating a solar panel 238. In a cooling process, the variable speed compressor 150 pumps refrigerant towards the solar panel 238, and the thermal energy absorbed from the solar panel 238 will increase the pressure of the refrigerant, allowing the variable speed compressor 150 to reduce mechanical compression and thus reduce electricity consumption. The refrigerant then flows through a first thermal exchange coil 160 to a first reversing valve 264, which directs the superheated refrigerant through the condenser coil 260. The refrigerant then flows to a second reversing valve 266 and directs the refrigerant into the evaporator coil of a second heat exchanger 130, in which high-pressure, warm refrigerant is rapidly released and changes state to a cold, low-pressure vapor. The refrigerant is then directed to a third reversing valve 268 in which it by-passes the mixing chamber 110 used in heating cycle and back to the compressor 150 to repeat the cycle. The increased pressure obtained by the solar panel can greatly reduce the electrical consumption of the compressor.

Figure 18:
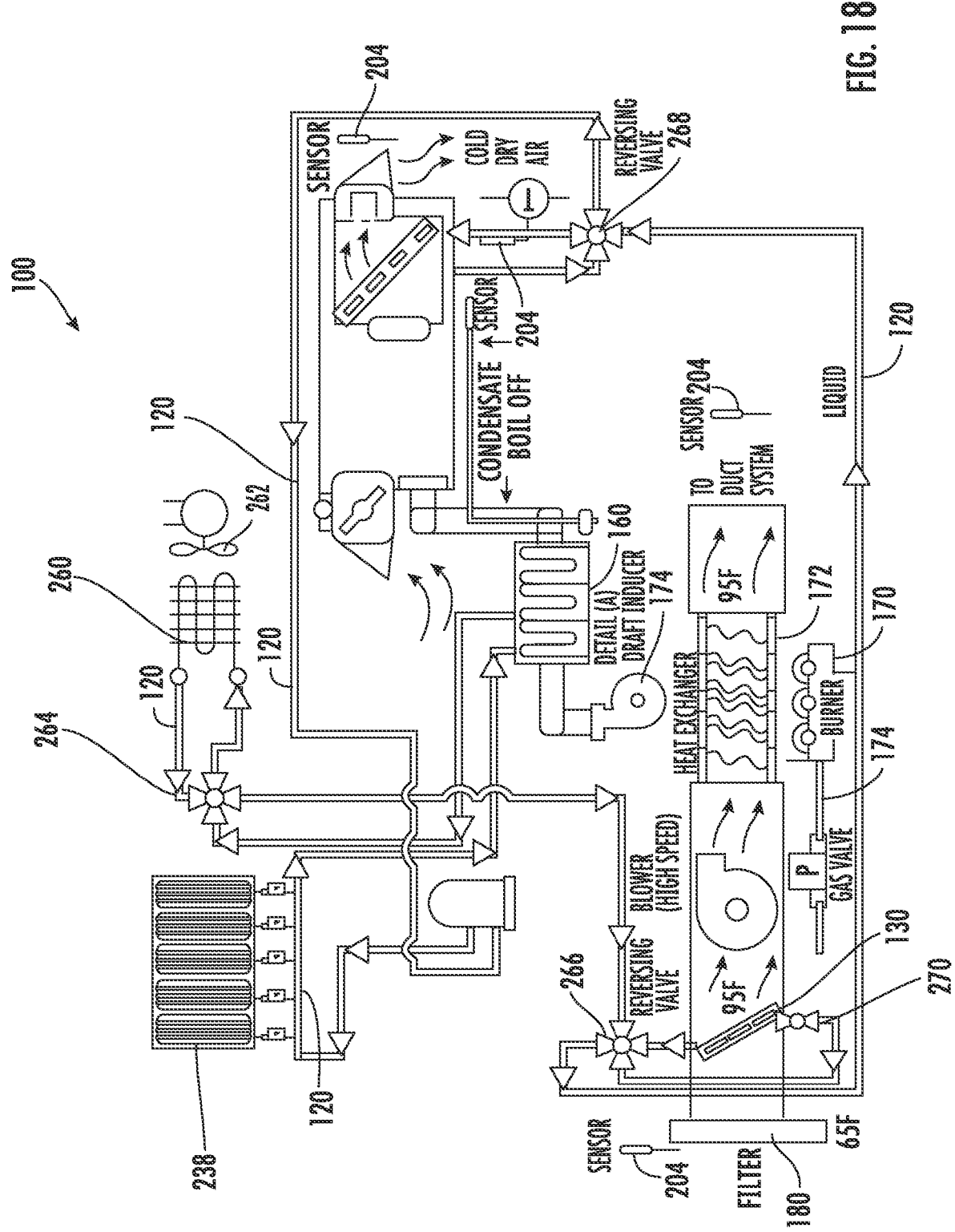
FIG. 18 illustrates another embodiment of a heat recovery system of the present invention incorporating a solar panel in a heating cycle, according to one embodiment of the present invention.

FIG. 18 illustrates another heat recovery system incorporating a solar panel 238. In a heating cycle, heat is extracted from the air even in cold conditions and returned to a building by efficient methods of operation. Refrigerant is pumped from the variable speed compressor 150 towards the solar panel 238. The solar panel 238 increase the pressure of refrigerant on the high-temperature side of the refrigeration cycle, lowering the speed of the variable speed compressor 150. This in turn lowers electrical consumption and allows heat to be delivered on a cold day to a building using little electrical energy and no fossil fuel. The refrigerant is sent through the first thermal exchange coil 160 to a first reversing valve 264, bypassing the condensing coil 260. Warm refrigerant is directed to the in-door coil, which here functions as a condensing coil of the second heat exchanger 130 and releases the heat absorbed from the outside air into the building. The refrigerant then passes through the thermal expansion valve 270 and cool the refrigerant, and the refrigerant flows to the third reversing valve 268, where it is directed to the mixing chamber 110 for release as cold air. The refrigerant is then directed back to the compressor 150 to repeat the cycle.

FIG. 19 depicts another heat recovery system incorporating a solar panel 238. In a heating cycle of a heat and recovery system incorporating solar panel 238, refrigerant is pumped from the variable speed compressor 150 toward the thermal solar panel 238. Thermal energy obtained by the solar panel 238 will increase the pressure of the refrigerant and reduce the speed of the variable speed compressor 150. The warm refrigerant will flow to the first thermal exchange coil 160, which will significantly heat the refrigerant with the flue gas from the combustion process. This will raise the refrigerant pressure and enable the compressor 150 to operate at a lower speed. Refrigerant flow to the first reversing valve 264 will bypass the condensing coil 260 and be sent to the second reversing valve 266, which will direct the refrigerant to the indoor coil of the second heat exchanger 130, which will act as a condensing coil, release the heat into a building, and significantly reduce the amount of fossil fuel required to achieve the results of a conventional heat recovery system. The present method will also eliminate thermal pollution and significantly reduce greenhouse gas emissions. The refrigerant then passes through the thermal expansion valve 270, becoming a cold, low-pressure vapor. The refrigerant is then directed to the third reversing valve 268, which sends it through the mixing chamber 110. The refrigerant can thus capture the waste heat and flue gases generated by the heating apparatus or furnace 170. All the latent heat is removed from the flue gas and returned to the building via the refrigeration cycle. In addition, the flue gas is mixed with the cold dry outdoor air, resulting in a large volume of energy-rich dew droplets for the evaporator coil 116 to remove if all available heat from the cold outdoor air will be used to heat the building via the refrigeration cycle. The refrigerant is then directed back to the compressor 150 to repeat the cycle.

In the heating mode, the condensing fan 260 spin in reverse direction. This would draw heat away from the solar panel 238 on winter days and into the evaporating coil 116 of the heat pump in the heating mode. This would dramatically increase the ability to transfer and absorb heat on very cold days. Those coldest days are when a heat pump system struggles to operate effectively.

In the heating mode, instead of the refrigerant being directed through the solar panel 238 as soon as it leaves the compressor 150 as in the cooling mode, the refrigerant goes through a standard heat pump cycle and is re-directed through the solar panel 238 after it travels through the evaporator coils 116 outside of the building. As such, heat is absorbed when the refrigerant travels back into the building and to the indoor coil second heat exchanger 130 to increase the heat within the building more efficiently.

The thermal recovery unit (TRU) of the present invention can improve efficiency of energy recovery from the hot flue gas and function as a variable capacity cooling stage in cooling mode. In heating mode, the TRU can increases the overall heating efficiency over 100% annual fuel utilization efficiency. Machine learning algorithms can further adjust the performance to become more efficient each cycle.

The TRU of the present invention can be installed as a rooftop unit. The installation process does not require separate panels, labor, air conditioning and refrigeration (ACR) charging, wiring or piping. An installer can remove an old roof top unit and install a new one since all electrical and mechanical devices are internal. Each TRU should face south in the northern hemisphere to make the effective use of solar energy. An installer can easily match an old roof curb to accommodate the TRU of the present invention with little labor or cost by simply mounting an adapter to the old curb.

The TRU incorporated with solar panels can utilize solar energy to increase the efficiency of heat recovery system and reduce utility cost. The TRU of present invention has advantages over conventional systems in that it produces less greenhouse gas and makes effective use of solar energy and heat energy that is typically released into the environment. The present invention enables a dramatic reduction in electrical consumption by the compressors in the refrigeration circuit, which in turn transfer the thermal energy from the flue gas and environmental mixture flow back into the system to the improve system efficiency.

The current invention can be used in residential and/or commercial air conditioning and heat pumps. The residential condensing units and/or heat pumps can work in conjunction with a typical residential furnace.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

The foregoing is provided for illustrative and exemplary purposes; the present invention is not necessarily limited thereto. Rather, those skilled in the art will appreciate that various modifications, as well as adaptations to particular circumstances, are possible within the scope of the invention as herein shown and described.

What is claimed is:

1. A method of recovering heat and energy comprising:
feeding excess heat and waste products emitted as a result of fuel combustion into a mixing chamber comprising a first heat exchanger coupled with a fluid containing conduit circuit;
feeding air into the mixing chamber for initiating a reaction with the waste products to produce a reaction product with potential energy;
effectuating heat energy exchange through the reaction product and excess heat interacting with the first heat exchanger, whereby temperature and pressure of fluid within the first heat exchanger and fluid circuit connected to the first heat exchanger rises;
pressurizing fluid by a compressor contained in the fluid circuit, by utilizing heat energy from the exhaust gas and waste products emitted as the result of fuel combustion and by utilizing thermal energy obtained from a solar panel; and
exchanging heat energy by forcing air over a second heat exchanger that is in fluid communication with the pressurized fluid containing conduit circuit exteriorly of the mixing chamber.

2. The method of claim 1, wherein the solar panel includes a plurality of solar cells connected in parallel.

3. The method of claim 2, wherein a temperature sensor is mounted within each of the plurality of solar cells, and configured to measure temperature inside the respective solar cell, and wherein each solar cell is connected to the conduit circuit via a respective pressure valve, and the status of the pressure valve is configured to depend on the measurement of the temperature sensor in the respective solar cell.

4. The method of claim 3, wherein a respective pressure valve is configured to open when the measurement of a respective temperature sensor in a respective solar cell is above a certain threshold.

5. The method of claim 3, wherein a respective pressure valve is configured to close when the measurement of the respective temperature sensor is below a certain threshold.

6. The method of claim 3, wherein the solar panel further includes a bypass channel for fluid to pass there through when all the pressure valves are closed.

* * * * *